United States Patent
Ito et al.

(10) Patent No.: US 11,692,823 B2
(45) Date of Patent: Jul. 4, 2023

(54) THREE-DIMENSIONAL SURVEY APPARATUS, THREE-DIMENSIONAL SURVEY METHOD, AND THREE-DIMENSIONAL SURVEY PROGRAM

(71) Applicant: Topcon Corporation, Tokyo (JP)

(72) Inventors: Tadayuki Ito, Tokyo (JP); Kenichiro Yoshino, Tokyo (JP); Yoshihiro Nishi, Tokyo (JP); Motohiro Miyajima, Tokyo (JP)

(73) Assignee: Topcon Corporation, Tokyo (JP)

( * ) Notice: Subject to any disclaimer, the term of this patent is extended or adjusted under 35 U.S.C. 154(b) by 286 days.

(21) Appl. No.: 17/017,715

(22) Filed: Sep. 11, 2020

(65) Prior Publication Data

US 2021/0080256 A1    Mar. 18, 2021

(30) Foreign Application Priority Data

Sep. 13, 2019 (JP) .................................. 2019-167412

(51) Int. Cl.
  *G01C 15/00* (2006.01)
  *G02B 26/10* (2006.01)
  *G02B 27/30* (2006.01)

(52) U.S. Cl.
  CPC .......... *G01C 15/002* (2013.01); *G02B 26/10* (2013.01); *G02B 27/30* (2013.01)

(58) Field of Classification Search
  CPC ....... G01C 15/002; G02B 26/10; G02B 27/30
  See application file for complete search history.

(56) References Cited

U.S. PATENT DOCUMENTS

| | | |
|---|---|---|
| 8,045,762 B2 | 10/2011 | Otani et al. |
| 10,551,188 B2 | 2/2020 | Sasaki et al. |
| 10,739,458 B2 | 8/2020 | Zweigle et al. |

(Continued)

FOREIGN PATENT DOCUMENTS

| | | |
|---|---|---|
| EP | 3258212 A1 | 12/2017 |
| JP | 2003269963 A | 9/2003 |

(Continued)

OTHER PUBLICATIONS

Extended European Search Report dated Mar. 2, 2021, in connection with European Patent Application No. 20195608.3, 11 pgs.

(Continued)

*Primary Examiner* — Roy M Punnoose
(74) *Attorney, Agent, or Firm* — Chiesa, Shahinian & Giantomasi PC

(57) ABSTRACT

To provide a three-dimensional survey apparatus, a three-dimensional survey method, and a three-dimensional survey program which are capable of suppressing an occurrence of a data-deficient part. A three-dimensional survey apparatus includes a collimating ranging unit, a scanner unit, and a control calculation portion. If there is a data-deficient part where three-dimensional data is not acquired among a measurement object when the scanner unit acquires point cloud data, the control calculation portion executes control to replenish the three-dimensional data related to the data-deficient part having been acquired by the collimating ranging unit to the point cloud data having been acquired by the scanner unit.

13 Claims, 7 Drawing Sheets

(56) References Cited

U.S. PATENT DOCUMENTS

| | | | |
|---|---|---|---|
| 10,816,783 B2 | 10/2020 | Yamashita et al. | |
| 11,340,068 B2 | 5/2022 | Koji | |
| 2008/0075326 A1 | 3/2008 | Otani et al. | |
| 2013/0293684 A1* | 11/2013 | Becker ................. | G01B 11/245 |
| | | | 348/47 |
| 2017/0336508 A1 | 11/2017 | Zweigle et al. | |
| 2017/0363421 A1 | 12/2017 | Kumagai et al. | |
| 2019/0101389 A1 | 4/2019 | Koji | |
| 2019/0113728 A1 | 4/2019 | Yamashita et al. | |
| 2019/0219393 A1* | 7/2019 | Sasaki ................. | G01C 11/025 |
| 2021/0080577 A1* | 3/2021 | Ito ........................ | G01S 7/4817 |
| 2021/0080578 A1* | 3/2021 | Ito ........................ | G01C 15/002 |

FOREIGN PATENT DOCUMENTS

| | | | |
|---|---|---|---|
| JP | 2004037162 A | 2/2004 | |
| JP | 2008082707 A | 4/2008 | |
| JP | 2016191630 A | 11/2016 | |
| JP | 2017223540 A | 12/2017 | |
| JP | 2017536554 A | 12/2017 | |
| JP | 2019066289 A | 4/2019 | |
| JP | 2019074668 A | 5/2019 | |
| JP | 2019113507 A | 7/2019 | |
| JP | 2019124496 A | 7/2019 | |

OTHER PUBLICATIONS

Notice of Reasons for Refusal dated Apr. 19, 2023 in connection with Japanese Patent Application No. 2019-167412, 11 pgs. (including translation).

* cited by examiner

THREE-DIMENSIONAL SURVEY APPARATUS, THREE-DIMENSIONAL SURVEY METHOD, AND THREE-DIMENSIONAL SURVEY PROGRAM

CROSS-REFERENCE TO RELATED APPLICATIONS

This application claims priority to Japanese Patent Application No. 2019-167412, filed Sep. 13, 2019, the disclosure of which is incorporated herein by reference in its entirety.

TECHNICAL FIELD

The present invention relates to a three-dimensional survey apparatus, a three-dimensional survey method, and a three-dimensional survey program which acquire three-dimensional data of a measurement object.

BACKGROUND

Japanese Patent Application Laid-open No. 2017-223540 discloses a survey system provided with a total station and a laser scanner unit. The total station is a survey apparatus that measures three-dimensional coordinates (three-dimensional data) of a measurement point with high accuracy. The laser scanner unit rotatingly emits pulse laser light as ranging light and performs ranging for each pulse of pulse laser light to acquire point cloud data. More specifically, the laser scanner unit irradiates a measurement object with pulse laser light as ranging light and receives reflected light of each portion of the pulse laser light having been reflected by the measurement object, and by measuring a distance to the measurement object and detecting an emission direction (a horizontal angle and a vertical angle) of the ranging light, the laser scanner unit acquires three-dimensional data (three-dimensional point cloud data) of a large number of points of the measurement object.

Measurement accuracy of a total station including industrial measurement is extremely high. For example, when used in the field of survey, a total station can ensure measurement accuracy of 1 mm or less with respect to distance accuracy and, at the same time, a total station can ensure sufficient accuracy that is required by a class I theodolite and the like with respect to angle accuracy. The laser scanner unit is capable of executing a point group measurement of several hundreds of thousands of points per second and a highly-efficient survey can be realized at an extremely high speed.

Depending on reflection characteristics of the measurement object or a distance to the measurement object, intensity of reflected light that is reflected by a predetermined portion of the measurement object may be too high or too low. For example, depending on a material of the measurement object as reflection characteristics of the measurement object, the intensity of reflected light that is reflected by a predetermined portion of the measurement object may be too high or too low. As a result, when the laser scanner unit acquires point cloud data of the measurement object, there may be a data-deficient part that is referred to as a "missing part" or the like where three-dimensional data is not acquired among the measurement object. In this regard, a three-dimensional survey apparatus equipped with a laser scanner unit has room for improvement.

Alternatively, a total station has a higher measurement accuracy and a longer measurable distance (a reach distance) but a longer measurement time as compared to a laser scanner unit. Conversely, as compared to a total station, a laser scanner unit can perform a highly-efficient survey in a short period of time but is inferior in terms of measurement accuracy and a measurable distance (a reach distance). For example, a measurable distance of a total station is approximately 500 m or longer and approximately several km or shorter. In contrast, a measurable distance of a laser scanner unit is shorter than approximately 100 m. Therefore, if there is a portion of the measurement object that is farther than the measurable distance of the laser scanner unit, when the laser scanner unit acquires point cloud data of the measurement object, there may be a data-deficient part that is referred to as a "missing part" or the like where three-dimensional data is not acquired among the measurement object. In this regard, a three-dimensional survey apparatus equipped with a laser scanner unit has room for improvement.

SUMMARY

The present invention has been made in order to solve the problem described above and an object thereof is to provide a three-dimensional survey apparatus, a three-dimensional survey method, and a three-dimensional survey program which are capable of suppressing an occurrence of a data-deficient part.

The problem described above is solved by a three-dimensional survey apparatus according to the present invention which acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the control calculation portion executes, if there is a data-deficient part of which the three-dimensional data is not acquired among the measurement object when the scanner unit acquires the point cloud data, control to replenish the three-dimensional data related to the data-deficient part having been acquired by the collimating ranging unit to the point cloud data.

With the three-dimensional survey apparatus according to the present invention, when the scanner unit acquires point cloud data of the measurement object, if there is a data-deficient part where three-dimensional data is not acquired among the measurement object, the control calculation portion executes control to replenish the three-dimensional data related to the data-deficient part having been acquired by the collimating ranging unit to the point cloud data having been acquired by the scanner unit. Accordingly, even if there is a data-deficient part among the measurement object when the scanner unit acquires point cloud data of the measurement object, the control calculation portion can suppress an occurrence of a data-deficient part by executing so-called "hole-plugging" of a "missing part" of three-dimensional data by replenishing the three-dimensional data related to the data-deficient part having been acquired by the collimating ranging unit to the point cloud data having been acquired by the scanner unit.

In the three-dimensional survey apparatus according to the present invention, preferably, the collimating ranging unit directly acquires the three-dimensional data related to the data-deficient part that is set at a measurement location by the collimation of the telescope portion.

With the three-dimensional survey apparatus according to the present invention, the collimating ranging unit performs a survey (ranging and angle measurement) of the data-deficient part set at a measurement location by the collimation of the telescope portion of the collimating ranging unit to directly acquire the three-dimensional data related to the data-deficient part. Accordingly, the control calculation portion can more reliably suppress an occurrence of a data-deficient part by reliably replenishing the three-dimensional data related to the data-deficient part having been directly acquired by the collimating ranging unit with the point cloud data having been acquired by the scanner unit.

In the three-dimensional survey apparatus according to the present invention, preferably, the collimating ranging unit indirectly acquires the three-dimensional data related to the data-deficient part by acquiring the three-dimensional data related to a target of measurement which is set in the data-deficient part and which is set at a measurement location by the collimation of the telescope portion.

With the three-dimensional survey apparatus according to the present invention, the collimating ranging unit performs a survey (ranging and angle measurement) of a target of measurement that is set at a measurement location by the collimation of the telescope portion to acquire the three-dimensional data related to the target of measurement. The target of measurement is set in the data-deficient part among the measurement object. Accordingly, the three-dimensional data related to the data-deficient part is indirectly acquired based on the three-dimensional data related to the target of measurement having been acquired by the collimating ranging unit. Accordingly, the control calculation portion can more reliably suppress an occurrence of a data-deficient part by reliably replenishing the three-dimensional data related to the data-deficient part having been indirectly acquired via the target of measurement by the collimating ranging unit with the point cloud data having been acquired by the scanner unit.

In the three-dimensional survey apparatus according to the present invention, preferably, the collimating ranging unit acquires the three-dimensional data related to the data-deficient part by executing an automatic scan in a region that is set as the data-deficient part.

With the three-dimensional survey apparatus according to the present invention, the collimating ranging unit executes an automatic scan in a region that is set at the measurement location as the data-deficient part, performs a survey (ranging and angle measurement) of the data-deficient part, and acquires the three-dimensional data related to the data-deficient part. Accordingly, for example, even if a worker or the like does not set the measurement location for each data-deficient part by collimation of the telescope portion, by setting a prescribed region as the data-deficient part, the collimating ranging unit automatically executes a scan and acquires the three-dimensional data related to the data-deficient part. Therefore, the collimating ranging unit can efficiently acquire the three-dimensional data related to the data-deficient part. Accordingly, the control calculation portion can suppress an occurrence of a data-deficient part by efficiently replenishing the three-dimensional data related to the data-deficient part having been acquired by the collimating ranging unit to the point cloud data having been acquired by the scanner unit.

In the three-dimensional survey apparatus according to the present invention, preferably, the control calculation portion recognizes the data-deficient part and automatically sets the region in which the scan is to be performed by the collimating ranging unit.

With the three-dimensional survey apparatus according to the present invention, even if the worker or the like does not set a region to be automatically scanned by the collimating ranging unit using an operation display portion or the like, the control calculation portion recognizes the data-deficient part and automatically sets the region in which the automatic scan is to be performed by the collimating ranging unit. Accordingly, the control calculation portion can efficiently acquire the three-dimensional data related to the data-deficient part with the collimating ranging unit and efficiently replenish the three-dimensional data related to the data-deficient part to the point cloud data having been acquired by the scanner unit.

In the three-dimensional survey apparatus according to the present invention, preferably, the control calculation portion executes control to adjust a diaphragm of the telescope portion for each measurement location when executing the scan by the collimating ranging unit.

With the three-dimensional survey apparatus according to the present invention, by having the control calculation portion adjust the diaphragm of the telescope portion for each measurement location, when executing the automatic scan, the collimating ranging unit can more reliably acquire the three-dimensional data related to the data-deficient part even when intensity of reflected light that is reflected by a prescribed portion of the measurement object is relatively high. Accordingly, the control calculation portion can more reliably suppress an occurrence of a data-deficient part by reliably replenishing the three-dimensional data related to the data-deficient part having been acquired by the collimating ranging unit with the point cloud data having been acquired by the scanner unit.

The problem described above is solved by a three-dimensional survey method according to the present invention which is executed by a three-dimensional survey apparatus that acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the three-dimensional survey method includes the step of: replenishing, if there is a data-deficient part of which the three-dimensional data is not acquired among the measurement object when the scanner unit acquires the point cloud data, the three-dimensional data related to the data-deficient part having been acquired by the collimating ranging unit to the point cloud data.

With the three-dimensional survey method according to the present invention, when the scanner unit acquires point cloud data of the measurement object, if there is a data-deficient part where three-dimensional data is not acquired among the measurement object, a step of replenishing the three-dimensional data related to the data-deficient part having been acquired by the collimating ranging unit to the point cloud data having been acquired by the scanner unit is performed. Accordingly, even if there is a data-deficient part among the measurement object when the scanner unit acquires point cloud data of the measurement object, an occurrence of a data-deficient part can be suppressed by executing "hole-plugging" of a so-called "missing part" of three-dimensional data by replenishing the three-dimensional data related to the data-deficient part having been acquired by the collimating ranging unit to the point cloud data having been acquired by the scanner unit.

The problem described above is solved by a three-dimensional survey program according to the present invention which is executed by a computer of a three-dimensional survey apparatus that acquires three-dimensional data of a measurement object, the three-dimensional survey apparatus including: a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation; a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data related to the measurement object; and a control calculation portion which is provided in at least one of the collimating ranging unit and the scanner unit, wherein the three-dimensional survey program causes the computer to execute the step of: replenishing, if there is a data-deficient part of which the three-dimensional data is not acquired among the measurement object when the scanner unit acquires the point cloud data, the three-dimensional data related to the data-deficient part having been acquired by the collimating ranging unit to the point cloud data.

With the three-dimensional survey program according to the present invention, when the scanner unit acquires point cloud data of the measurement object, if there is a data-deficient part where three-dimensional data is not acquired among the measurement object, a step of replenishing the three-dimensional data related to the data-deficient part having been acquired by the collimating ranging unit to the point cloud data having been acquired by the scanner unit is performed. Accordingly, even if there is a data-deficient part among the measurement object when the scanner unit acquires point cloud data of the measurement object, an occurrence of a data-deficient part can be suppressed by executing "hole-plugging" of a so-called "missing part" of three-dimensional data by replenishing the three-dimensional data related to the data-deficient part having been acquired by the collimating ranging unit to the point cloud data having been acquired by the scanner unit.

According to the present invention, a three-dimensional survey apparatus, a three-dimensional survey method, and a three-dimensional survey program which are capable of suppressing an occurrence of a data-deficient part can be provided.

DETAILED DESCRIPTION

Figure 1:
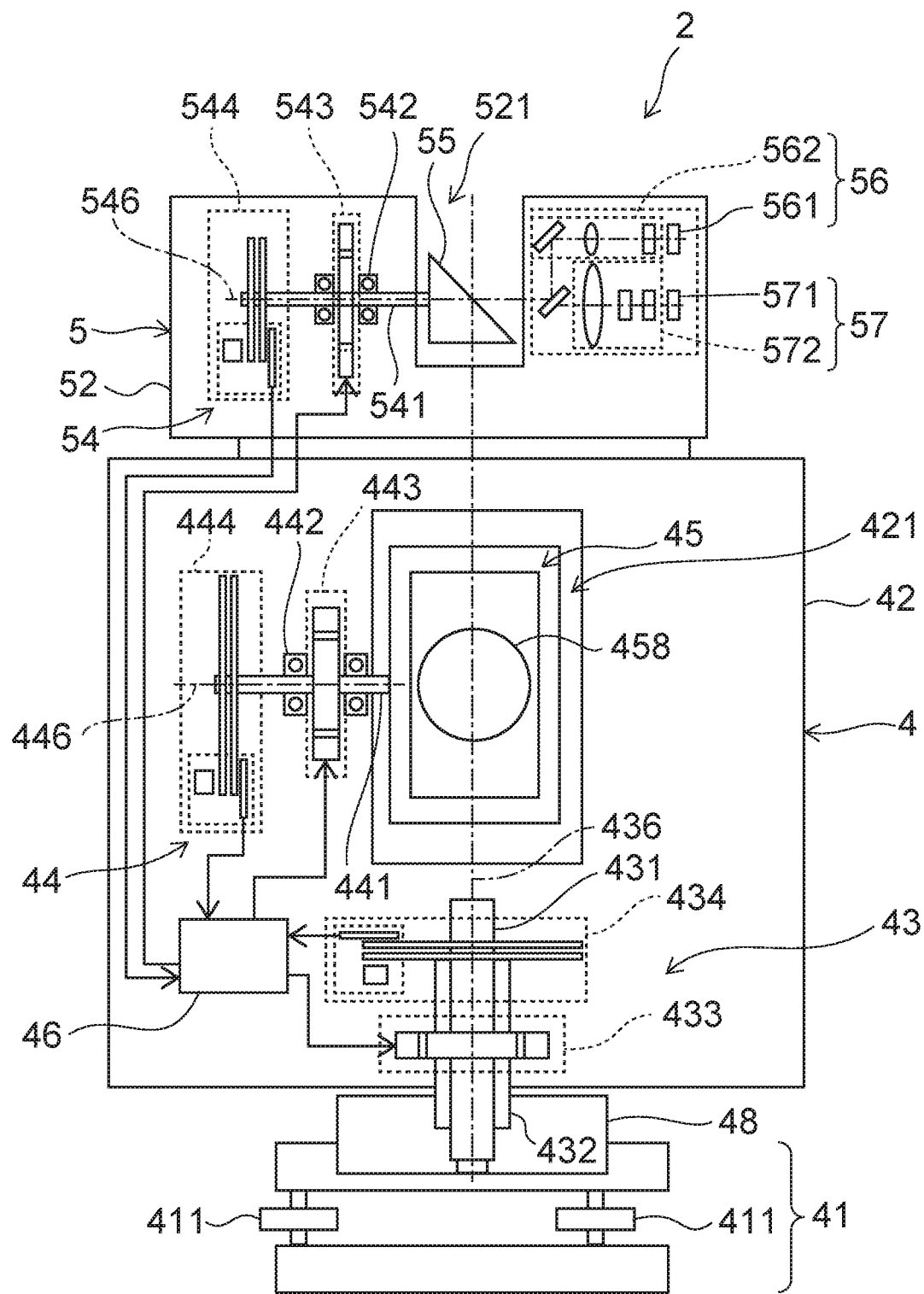
FIG. 1 is a block diagram which mainly shows a structural system of a three-dimensional survey apparatus according to an embodiment of the present invention.

Hereinafter, a preferred embodiment of the present invention will be described in detail with reference to the drawings.

Although the embodiment described hereinafter is a preferred specific example of the present invention and therefore involves various favorable technical limitations, it is to be understood that the scope of the present invention is by no means limited by the embodiment unless specifically noted otherwise hereinafter. It should also be noted that, in the drawings, similar components will be denoted by same reference signs and detailed descriptions thereof will be omitted when appropriate.

FIG. 1 is a block diagram which mainly shows a structural system of a three-dimensional survey apparatus according to an embodiment of the present invention.

Figure 2:
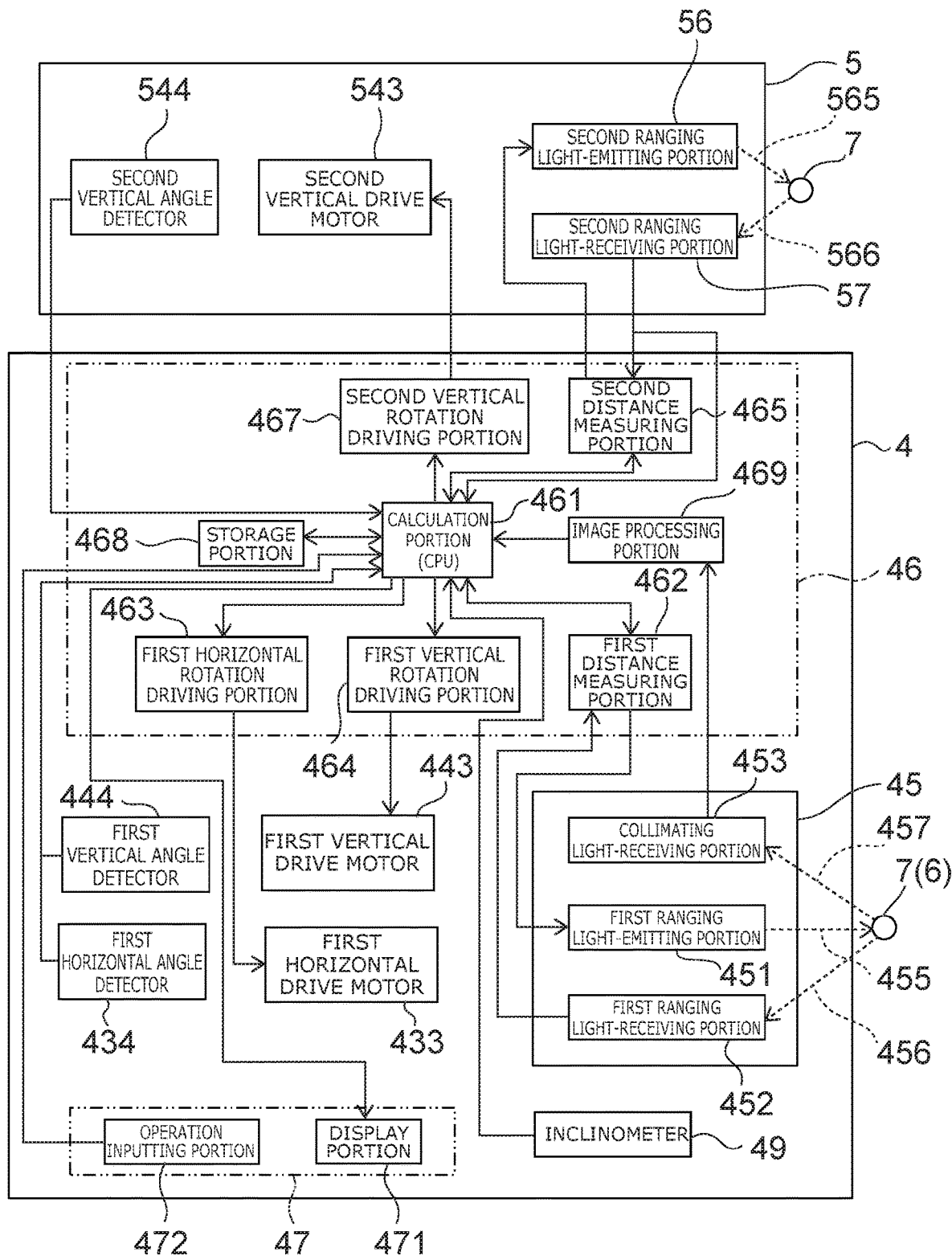
FIG. 2 is a block diagram which mainly shows a control system of the three-dimensional survey apparatus according to the present embodiment.

FIG. 2 is a block diagram which mainly shows a control system of the three-dimensional survey apparatus according to the present embodiment.

A three-dimensional survey apparatus 2 according to the present embodiment includes a collimating ranging unit 4 and a scanner unit 5 and acquires three-dimensional data of a measurement object 7 such as an architectural structure. The collimating ranging unit 4 is referred to as a total station or the like and, due to collimation of a telescope portion 45, irradiates the measurement object 7 with first ranging light 455 (refer to FIG. 2), measures a distance to the measurement object 7 based on first reflected ranging light 456 (refer to FIG. 2) that is the first ranging light 455 having been reflected by the measurement object 7 and first internal reference light (not illustrated), and detects an emission direction of the first ranging light 455 or, in other words, a direction of collimation of the telescope portion 45. In other words, the collimating ranging unit 4 is a device that performs ranging and angle measurement. Details of the collimating ranging unit 4 will be provided later.

Measurement objects of which the collimating ranging unit 4 performs ranging and angle measurement include a target of measurement 6 such as a prism. In other words, the collimating ranging unit 4 is capable of performing ranging and angle measurement with respect to the target of measurement 6 such as a prism as a measurement object. The prism to be used as the target of measurement 6 is not particularly limited and may be a circular prism, a spherical prism, or a planar prism.

The scanner unit 5 is integrally provided with the collimating ranging unit 4. In the three-dimensional survey apparatus 2 according to the present embodiment, the scanner unit 5 is fixed to an upper part of the collimating ranging unit 4. Alternatively, the scanner unit 5 may be rotatably provided relative to the collimating ranging unit 4. The scanner unit 5 irradiates the measurement object 7 with second ranging light 565 (refer to FIG. 2), measures a distance to the measurement object 7 based on second reflected ranging light 566 (refer to FIG. 2) that is reflection of the second ranging light 565 by the measurement object 7 and second internal reference light (not illustrated), and detects an emission direction of the second ranging light 565. The scanner unit 5 is a device that performs ranging and angle measurement in a similar manner to the collimating ranging unit 4.

More specifically, the scanner unit 5 acquires three-dimensional coordinates (three-dimensional data) of a large number of measurement points with respect to the measurement object 7 by performing rotational irradiation with the second ranging light 565 to measure the distance to the measurement object 7 and to detect the emission direction of the second ranging light 565. In other words, the scanner unit 5 acquires three-dimensional data (point cloud data) of a large number of measurement points of the measurement object 7. Details of the scanner unit 5 will be provided later.

The collimating ranging unit 4 according to the present embodiment has a leveling portion 41, a first mount portion 42, a first horizontal rotation portion 43, a first vertical rotation portion 44, the telescope portion 45, a control calculation portion 46, an operation display portion 47, a base portion 48, and an inclinometer 49. The collimating ranging unit 4 need not necessarily include the inclinometer 49. The collimating ranging unit 4 may have an automatic tracking function that automatically searches for the target of measurement 6 as a measurement object.

The control calculation portion 46 has a calculation portion 461, a first distance measuring portion 462, a first horizontal rotation driving portion 463, a first vertical rotation driving portion 464, a second distance measuring portion 465, a second vertical rotation driving portion 467, a storage portion 468, and an image processing portion 469. The calculation portion 461 is a central processing unit (CPU) or the like and, based on a signal (command) transmitted from an operation inputting portion 472 of the operation display portion 47, executes activation of a program, control processing of the signal, calculations, drive control of a display portion 471 of the operation display portion 47, and the like. In other words, the calculation portion 461 performs control of the entire three-dimensional survey apparatus 2 and causes the display portion 471 to display survey conditions, measurement results (ranging results and angle measurement results), image processing results (2D images of received light intensity), and the like.

Alternatively, the control calculation portion 46 may be provided in the scanner unit 5 or may be provided in both the collimating ranging unit 4 and the scanner unit 5. In other words, the control calculation portion 46 is provided in at least one of the collimating ranging unit 4 and the scanner unit 5.

The first distance measuring portion 462, the first horizontal rotation driving portion 463, the first vertical rotation driving portion 464, the second distance measuring portion 465, the second vertical rotation driving portion 467, and the image processing portion 469 are realized as the calculation portion 461 executes a program stored in the storage portion 468. Alternatively, the first distance measuring portion 462, the first horizontal rotation driving portion 463, the first vertical rotation driving portion 464, the second distance measuring portion 465, the second vertical rotation driving portion 467, and the image processing portion 469 may be realized by hardware or may be realized by a combination of hardware and software.

For example, the storage portion 468 stores a sequence program for measurement, an image processing program for image processing, a calculation program, or the like. Examples of the storage portion 468 include a semiconductor memory built into the three-dimensional survey apparatus 2 or the like. Other examples of the storage portion 468 include various storage media connectable to the three-dimensional survey apparatus 2 such as a compact disc (CD), a digital versatile disc (DVD), a random access memory (RAM), and a read only memory (ROM).

A program that is executed by a computer including the control calculation portion 46 corresponds to the "three-dimensional survey program" according to the present invention. A "computer" as used herein is not limited to a personal computer and collectively refers to devices and apparatuses capable of realizing functions of the present invention including arithmetic processing units and microcomputers included in information processing devices.

The leveling portion 41 is a portion to be attached to a tripod (not illustrated) and has, for example, three adjustment screws 411. Leveling of the leveling portion 41 is performed by adjusting, at a survey position, the adjustment screws 411 so that an inclination sensor (not illustrated) provided on the first mount portion 42 detects level. In other words, the first mount portion 42 is kept level by leveling using the adjustment screws 411 at a survey position.

The first horizontal rotation portion 43 has a first horizontal rotary shaft 431, a bearing 432, a first horizontal drive motor 433, and a first horizontal angle detector (for example, an encoder) 434. The first horizontal rotary shaft 431 has a vertically-extending first vertical axial center 436 and is rotatably supported by the base portion 48 via the bearing 432. The first mount portion 42 is supported by the first horizontal rotary shaft 431 and integrally rotates with the first horizontal rotary shaft 431 in a horizontal direction around the first vertical axial center 436 due to a drive force transmitted from the first horizontal drive motor 433.

A rotational angle of the first horizontal rotary shaft 431 relative to the base portion 48 (in other words, a rotational angle of the first mount portion 42) is detected by the first horizontal angle detector 434. A detection result of the first horizontal angle detector 434 is input to the calculation portion 461. Drive of the first horizontal drive motor 433 is controlled by the first horizontal rotation driving portion 463 based on the detection result of the first horizontal angle detector 434.

The first vertical rotation portion 44 has a first vertical rotary shaft 441, a bearing 442, a first vertical drive motor 443, and a first vertical angle detector (for example, an encoder) 444. The first vertical rotary shaft 441 has a horizontally-extending first horizontal axial center 446 and is rotatably supported by the first mount portion 42 via the bearing 442. One end of the first vertical rotary shaft 441 protrudes into a gap portion 421 of the first mount portion 42. The telescope portion 45 is supported by the one end of the first vertical rotary shaft 441 that protrudes into the gap portion 421 of the first mount portion 42, and integrally rotates with the first vertical rotary shaft 441 in a vertical direction around the first horizontal axial center 446 due to a drive force transmitted from the first vertical drive motor 443.

The first vertical angle detector 444 is provided at another end of the first vertical rotary shaft 441. A rotational angle of the first vertical rotary shaft 441 relative to the first mount portion 42 (in other words, a rotational angle of the telescope portion 45) is detected by the first vertical angle detector 444. A detection result of the first vertical angle detector 444 is input to the calculation portion 461. Drive of the first vertical drive motor 443 is controlled by the first vertical rotation driving portion 464 based on the detection result of the first vertical angle detector 444.

As described earlier, the telescope portion 45 is supported by the first vertical rotary shaft 441 and rotates in a vertical direction around the first horizontal axial center 446 due to a drive force transmitted from the first vertical drive motor 443. The telescope portion 45 has a collimating telescope 458, and is collimated to the measurement object 7 including the target of measurement 6 and irradiates the measurement object 7 with the first ranging light 455. The first ranging light 455 is emitted onto a ranging optical axis of the telescope portion 45. The ranging optical axis of the telescope portion 45 intersects with the first vertical axial center 436 and is perpendicular to the first horizontal axial center 446. An intersection point of the ranging optical axis of the telescope portion 45 and the first vertical axial center 436 may be set to a machine reference point of the collimating ranging unit 4. In the description of the present embodiment, a case where the machine reference point of the collimating ranging unit 4 is an intersection point of the ranging optical axis of the telescope portion 45 and the first vertical axial center 436 will be cited as an example.

The telescope portion 45 has a first ranging light-emitting portion 451, a first ranging light-receiving portion 452, and a collimating light-receiving portion 453.

The first ranging light-emitting portion 451 is driven and controlled by the first distance measuring portion 462. The first ranging light-emitting portion 451 is provided inside the telescope portion 45 and, for example, emits the first ranging light 455 that is a laser beam or the like in a direction perpendicular to the first horizontal axial center 446. The first ranging light 455 emitted from the first ranging light-emitting portion 451 irradiates the measurement object 7. As described earlier, the measurement object of which the collimating ranging unit 4 performs ranging and angle measurement is not limited to the measurement object 7 such as an architectural structure and may be the target of measurement 6 such as a prism. The first reflected ranging light 456 that is reflected by the measurement object 7 is received by the first ranging light-receiving portion 452 provided inside the telescope portion 45. The first ranging light-receiving portion 452 converts brightness and darkness (a light reception result) of the received first reflected ranging light 456 into an electronic signal (a light reception signal) and transmits the light reception signal to the first distance measuring portion 462. In addition, the first ranging light-receiving portion 452 receives internal reference light (not illustrated) guided from a reference light optical portion (not illustrated), converts the internal reference light into an electric signal, and transmits the electrical signal to the first distance measuring portion 462.

The first distance measuring portion 462 calculates the distance to the measurement object 7 based on the light reception signal transmitted from the first ranging light-receiving portion 452. In other words, the first reflected ranging light 456 and the internal reference light are respectively converted into a first reflected ranging light electrical signal and an internal reference light electrical signal and then sent to the first distance measuring portion 462. The distance to the measurement object 7 is measured based on a difference in time intervals between the first reflected ranging light electrical signal and the internal reference light electrical signal. A calculation result of the first distance measuring portion 462 is input to the calculation portion (CPU) 461.

The calculation portion 461 calculates coordinates of the measurement object 7 based on the measured distance to the measurement object 7, a vertical angle detected by the first vertical angle detector 444, and a horizontal angle detected by the first horizontal angle detector 434. Alternatively, the calculation portion 461 may calculate coordinates of the machine reference point of the collimating ranging unit 4 with a prescribed position as a reference based on the measured distance to the measurement object 7, the vertical angle detected by the first vertical angle detector 444, and the horizontal angle detected by the first horizontal angle detector 434.

The collimating light-receiving portion 453 is an image sensor such as a charge coupled device (CCD) or a complementary metal oxide semiconductor (CMOS) and receives reflected collimating light 457 with a wavelength region that differs from a wavelength region of the first reflected ranging light 456. The reflected collimating light 457 is light which has a wavelength region that differs from a wavelength region of the first reflected ranging light 456 and which is reflected by the measurement object 7. In other words, the collimating light-receiving portion 453 receives the reflected collimating light 457 that is reflected by the measurement object 7 and optically receives an image of the measurement object 7. Examples of the reflected collimating light 457 include natural light and infrared light. However, the reflected collimating light 457 is not limited thereto. The reflected collimating light 457 is received by the collimating light-receiving portion 453 provided inside the telescope portion 45. The collimating light-receiving portion 453 converts brightness and darkness (a light reception result) of the reflected collimating light 457 into an electronic signal (an image signal) and transmits the image signal to the image processing portion 469.

The image processing portion 469 executes image processing of the image signal transmitted from the collimating light-receiving portion 453 and transmits the processed image signal to the calculation portion 461 as an image data signal. The calculation portion 461 executes a calculation based on the image data signal transmitted from the image processing portion 469 and executes control to cause the display portion 471 of the operation display portion 47 to display an image of a collimation range of the telescope portion 45.

The inclinometer 49 measures an inclination (an inclination angle) of the collimating ranging unit 4 relative to gravity. A measurement result of the inclinometer 49 is input to the calculation portion 461.

The scanner unit 5 according to the present embodiment has a second mount portion 52, a second vertical rotation portion 54, a scanning mirror 55, a second ranging light-emitting portion 56, and a second ranging light-receiving portion 57 and is fixed to an upper part of the collimating ranging unit 4. Alternatively, the scanner unit 5 may have a horizontal rotation portion similar to the first horizontal rotation portion 43 of the collimating ranging unit 4. In this case, the scanner unit 5 is rotatably provided in the horizontal direction relative to the collimating ranging unit 4.

The second vertical rotation portion 54 has a second vertical rotary shaft 541, a bearing 542, a second vertical drive motor 543, and a second vertical angle detector (for example, an encoder) 544. The second vertical rotary shaft 541 has a horizontally-extending second horizontal axial center 546 and is rotatably supported by the second mount portion 52 via the bearing 542. One end of the second vertical rotary shaft 541 protrudes into a recessed portion 521 of the second mount portion 52. The scanning mirror 55 is supported by the one end of the second vertical rotary shaft 541 that protrudes into the recessed portion 521 of the second mount portion 52, and integrally rotates with the second vertical rotary shaft 541 in a vertical direction around the second horizontal axial center 546 due to a drive force transmitted from the second vertical drive motor 543.

The second vertical angle detector 544 is provided at another end of the second vertical rotary shaft 541. A rotational angle of the second vertical rotary shaft 541 relative to the second mount portion 52 (in other words, a rotational angle of the scanning mirror 55) is detected by the second vertical angle detector 544. A detection result of the second vertical angle detector 544 is input to the calculation portion 461. Drive of the second vertical drive motor 543 is controlled by the second vertical rotation driving portion 467 based on the detection result of the second vertical angle detector 544.

The second horizontal axial center 546 is parallel to the first horizontal axial center 446. A distance between the first horizontal axial center 446 and the second horizontal axial center 546 is known. In other words, a position of the second horizontal axial center 546 relative to the first horizontal axial center 446 is known.

The scanning mirror 55 is a deflecting optical member and reflects, at a right angle, the second ranging light 565 incident from a horizontal direction. In other words, the scanning mirror 55 reflects, in a direction perpendicular to the second horizontal axial center 546, the second ranging light 565 incident from a horizontal direction. As described earlier, the scanning mirror 55 is supported by the second vertical rotary shaft 541 and rotates in a vertical direction around the second horizontal axial center 546 due to a drive force transmitted from the second vertical drive motor 543. Accordingly, the scanning mirror 55 causes rotational irradiation with the second ranging light 565 to be performed within a plane that intersects with (specifically, perpendicular to) the second horizontal axial center 546. In addition, the scanning mirror 55 reflects, toward the second ranging light-receiving portion 57, the second reflected ranging light 566 reflected by the measurement object 7 and incident to the scanning mirror 55. In other words, the scanning mirror 55 reflects, in a direction parallel to the second horizontal axial center 546, the second reflected ranging light 566 reflected by the measurement object 7 and incident to the scanning mirror 55.

An intersection point of the second horizontal axial center 546 and the scanning mirror 55 is set to a machine reference point of the scanner unit 5. For example, the machine reference point of the collimating ranging unit 4 and the machine reference point of the scanner unit 5 are present on the first vertical axial center 436 as a same straight line. In other words, a vertical line that passes the machine reference point of the scanner unit 5 coincides with the first vertical axial center 436. A distance between the machine reference point of the collimating ranging unit 4 and the machine reference point of the scanner unit 5 is known.

As shown in FIG. 2, the second ranging light-emitting portion 56 has a light-emitting element 561 and a light-emitting optical portion 562 including an objective lens or the like and is driven and controlled by the second distance measuring portion 465. The light-emitting element 561 is, for example, a semiconductor laser and emits the second ranging light 565 via the light-emitting optical portion 562 onto an optical axis that matches the second horizontal axial center 546. The second ranging light 565 is a pulse laser beam of infrared light as invisible light. The light-emitting element 561 is controlled by the second distance measuring portion 465 and emits pulse light in a required state including a required light intensity and a required pulse interval.

As shown in FIG. 2, the second ranging light-receiving portion 57 has a light-receiving element 571 and a light-receiving optical portion 572 including a condenser lens or the like. The light-receiving element 571 receives the second reflected ranging light 566 which is the second ranging light 565 having been reflected by the measurement object 7, having been reflected by the scanning mirror 55, and having passed through the light-receiving optical portion 572. The light-receiving element 571 converts brightness and darkness (a light reception result) of the received second reflected ranging light 566 into an electronic signal (a light reception signal) and transmits the light reception signal to the second distance measuring portion 465 and the calculation portion 461. In addition, the light-receiving element 571 receives internal reference light (not illustrated) guided from the reference light optical portion (not illustrated), converts the internal reference light into an electric signal, and transmits the electrical signal to the second distance measuring portion 465.

The second distance measuring portion 465 calculates the distance to the measurement object 7 based on the light reception signal transmitted from the second ranging light-receiving portion 57 (specifically, the light-receiving element 571). In other words, the second reflected ranging light 566 and the internal reference light are respectively converted into a second reflected ranging light electrical signal and an internal reference light electrical signal and then sent to the second distance measuring portion 465. The distance to the measurement object 7 is measured based on a difference in time intervals between the second reflected ranging light electrical signal and the internal reference light electrical signal. A calculation result of the second distance measuring portion 465 is input to the calculation portion 461.

The calculation portion 461 calculates coordinates of the measurement object 7 based on the measured distance to the measurement object 7, a vertical angle detected by the second vertical angle detector 544, and a horizontal angle detected by the first horizontal angle detector 434. In addition, by recording coordinates of the measurement object 7 for each pulse light beam, the calculation portion 461 can obtain point cloud data with respect to an entire measurement range or point cloud data with respect to the measurement object 7.

Furthermore, the calculation portion 461 calculates intensity (reflection intensity) of the second reflected ranging light 566 based on a light reception signal transmitted from the light-receiving element 571 of the second ranging light-receiving portion 57 and executes control to cause an image indicating the intensity of the second reflected ranging light 566 to be superimposed on an image of a collimation range of the telescope portion 45 and to be displayed by the display portion 471 of the operation display portion 47. Accordingly, the worker or the like can check, on the display portion 471, a measurement location (a point or a region) where three-dimensional data has been acquired and a measurement location (a point or a region) where three-dimensional data has not been acquired among the measurement object 7. In other words, the worker or the like can check, on the display portion 471, whether or not there is a data-deficient part that is referred to as a "missing part" or the like where three-dimensional data is not acquired among the measurement object 7 when the scanner unit 5 acquires point cloud data.

Next, an outline of operations of the three-dimensional survey apparatus according to the present embodiment will be described with reference to the drawings.

Figure 3:
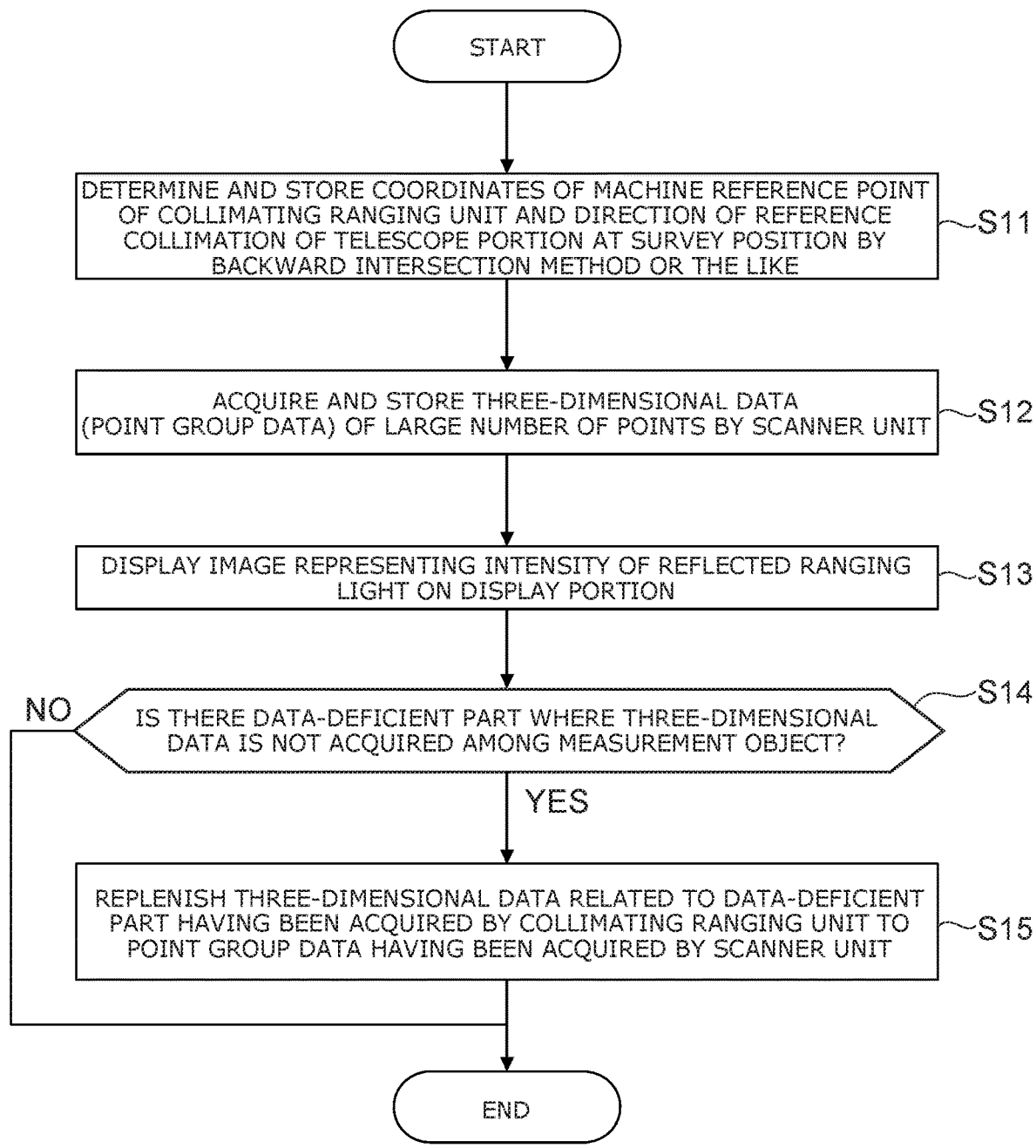
FIG. 3 is a flow chart which shows an outline of operations of the three-dimensional survey apparatus according to the present embodiment.

FIG. 3 is a flow chart which shows an outline of operations of the three-dimensional survey apparatus according to the present embodiment. FIG. 3 is, in other words, a flow chart showing an outline of steps executed by the three-dimensional survey method according to the present embodiment and steps which the three-dimensional survey program according to the present embodiment causes a computer of the three-dimensional survey apparatus 2 to execute.

First, in step S11, the control calculation portion 46 of the three-dimensional survey apparatus 2 determines coordinates of a machine reference point of the collimating ranging unit 4 and a direction of a reference collimation of the telescope portion 45 of the collimating ranging unit 4 at a survey position using a backward intersection method or the like and stores the coordinates and the direction in the storage portion 468. Specifically, based on a distance from the collimating ranging unit 4 to the target of measurement 6 such as a prism, a vertical angle detected by the first vertical angle detector 444, and a horizontal angle detected by the first horizontal angle detector 434, the control calculation portion 46 calculates coordinates of a machine reference point of the collimating ranging unit 4 and a direction of a reference collimation of the telescope portion 45 of the collimating ranging unit 4 and stores the coordinates and the direction in the storage portion 468.

Next, in step S12, the control calculation portion 46 controls the scanner unit 5 to acquire and store three-dimensional data (point cloud data) of a large number of measurement points of the measurement object 7. Next, in step S13, the control calculation portion 46 calculates intensity of the second reflected ranging light 566 based on a light reception signal transmitted from the light-receiving element 571 and executes control to cause an image indicating the intensity of the second reflected ranging light 566 to be superimposed on an image of a collimation range of the telescope portion 45 and to be displayed by the display portion 471.

In this case, depending on reflection characteristics of the measurement object 7 or a distance to the measurement object 7, the intensity of the second reflected ranging light 566 that is reflected by a predetermined portion of the measurement object 7 may be too high or too low. As a result, when the scanner unit 5 acquires point cloud data of the measurement object 7, there may be a data-deficient part that is referred to as a "missing part" or the like where three-dimensional data is not acquired among the measurement object 7.

By comparison, in the three-dimensional survey apparatus 2 according to the present embodiment, in step S14, a determination is made as to whether or not there is a data-deficient part where three-dimensional data is not acquired among the measurement object 7 based on point cloud data having been acquired by the scanner unit 5 in the processing of step S12.

In the three-dimensional survey apparatus 2 according to the present embodiment, since the control calculation portion 46 causes an image indicating the intensity of the second reflected ranging light 566 to be superimposed on an image of a collimation range of the telescope portion 45 and to be displayed by the display portion 471, the worker or the like can check, on the display portion 471, a measurement location where three-dimensional data has been acquired and a measurement location where three-dimensional data has not been acquired among the measurement object 7. In other words, the worker or the like can check, on the display portion 471, whether or not there is a data-deficient part that is referred to as a "missing part" or the like where three-dimensional data is not acquired among the measurement object 7 when the scanner unit 5 acquires point cloud data.

Alternatively, the control calculation portion 46 can distinguish a measurement location where three-dimensional data has been acquired from a measurement location where three-dimensional data has not been acquired among the measurement object 7 and, when the scanner unit 5 acquires point cloud data, the control calculation portion 46 can determine whether or not there is a data-deficient part that is referred to as a "missing part" or the like where three-dimensional data is not acquired among the measurement object 7.

In step S14, when there is no data-deficient part where three-dimensional data has not been acquired among the measurement object 7 (step S14: NO), the control calculation portion 46 ends the three-dimensional survey by the three-dimensional survey apparatus 2.

On the other hand, in step S14, when there is a data-deficient part where three-dimensional data has not been acquired among the measurement object 7 (step S14: YES), in step S15, the control calculation portion 46 executes control to replenish the three-dimensional data related to the data-deficient part having been acquired by the collimating ranging unit 4 to the point cloud data having been acquired by the scanner unit 5. Subsequently, the control calculation portion 46 ends the three-dimensional survey by the three-dimensional survey apparatus 2.

With the three-dimensional survey apparatus 2 according to the present embodiment, even if there is a data-deficient part among the measurement object 7 when the scanner unit 5 acquires point cloud data of the measurement object 7, the control calculation portion 46 can suppress an occurrence of a data-deficient part by executing "hole-plugging" of a so-called "missing part" of three-dimensional data by replenishing the three-dimensional data related to the data-deficient part having been acquired by the collimating ranging unit 4 to the point cloud data having been acquired by the scanner unit 5.

Next, specific examples of operations of the three-dimensional survey apparatus according to the present embodiment will be described with reference to the drawings.

Figure 4:
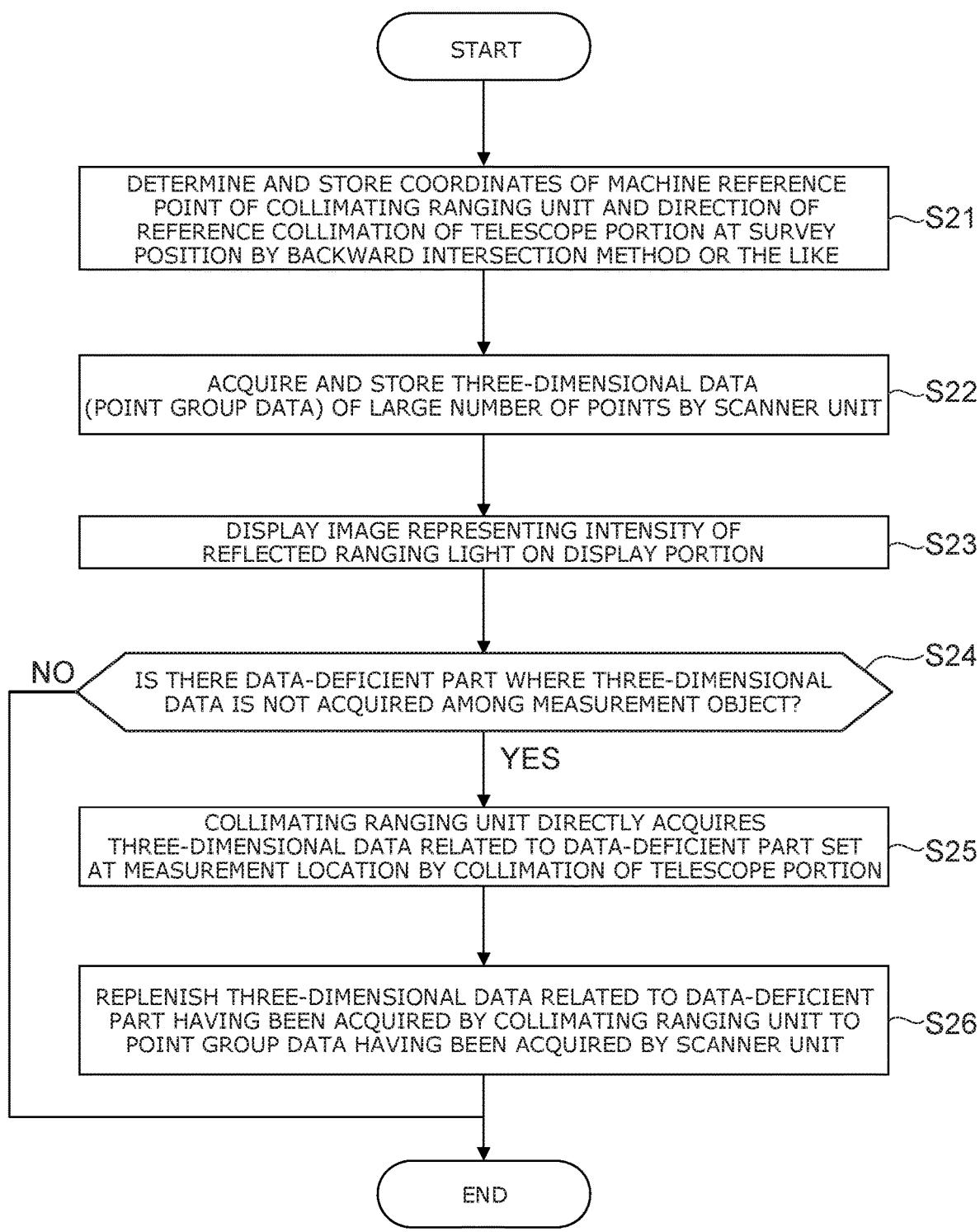
FIG. 4 is a flow chart that represents a first specific example of operations of the three-dimensional survey apparatus according to the present embodiment.

FIG. 4 is a flow chart that represents a first specific example of operations of the three-dimensional survey apparatus according to the present embodiment.

It should be noted that FIG. 4 and FIGS. 5 and 6 to be described later are, in other words, flow charts showing specific examples of steps executed by the three-dimensional survey method according to the present embodiment and steps which the three-dimensional survey program according to the present embodiment causes a computer of the three-dimensional survey apparatus 2 to execute.

First, processing of steps S21 to S24 is the same as the processing of steps S11 to S14 described earlier with reference to FIG. 3. In step S24, when there is a data-deficient part where three-dimensional data has not been acquired among the measurement object 7 (step S24: YES), in step S25, the collimating ranging unit 4 directly acquires the three-dimensional data related to the data-deficient part that has been set at a measurement location by collimation of the telescope portion 45. For example, the worker or the like checks a data-deficient part using an image indicating the intensity of the second reflected ranging light 566 that is displayed on the display portion 471 according to the processing of step S23 and sets a measurement location to be ranged by the collimating ranging unit 4 by a collimation of the telescope portion 45. Accordingly, the collimating ranging unit 4 performs a survey (ranging and angle measurement) of the data-deficient part set at a measurement location by the collimation of the telescope portion 45 of the collimating ranging unit 4 to directly acquire the three-dimensional data related to the data-deficient part.

Next, in step S26, the control calculation portion 46 executes control to replenish the three-dimensional data related to the data-deficient part having been acquired by the collimating ranging unit 4 to the point cloud data having been acquired by the scanner unit 5. The three-dimensional data to be replenished to the point cloud data is three-dimensional data which has been directly acquired by the collimating ranging unit 4 in step S25 and which is related to the data-deficient part set at the measurement location by the collimation of the telescope portion 45. Subsequently, the control calculation portion 46 ends the three-dimensional survey by the three-dimensional survey apparatus 2.

According to the first specific example, the control calculation portion 46 can more reliably suppress an occurrence of a data-deficient part by reliably replenishing the three-dimensional data related to the data-deficient part having been directly acquired by the collimating ranging unit 4 with the point cloud data having been acquired by the scanner unit 5.

Figure 5:
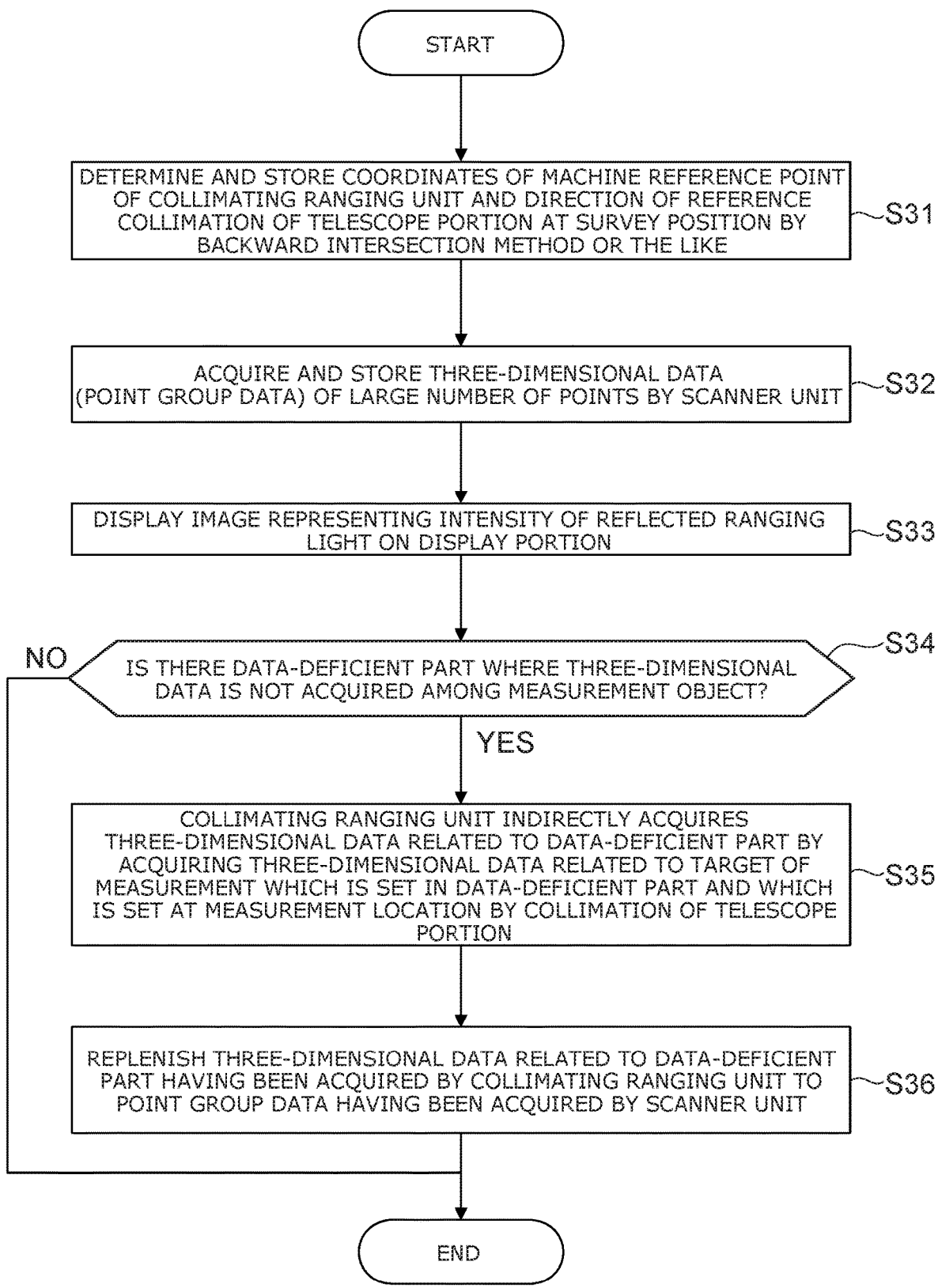
FIG. 5 is a flow chart that represents a second specific example of operations of the three-dimensional survey apparatus according to the present embodiment.

FIG. 5 is a flow chart that represents a second specific example of operations of the three-dimensional survey apparatus according to the present embodiment.

First, processing of steps S31 to S34 is the same as the processing of steps S11 to S14 described earlier with reference to FIG. 3.

In step S34, when there is a data-deficient part where three-dimensional data has not been acquired among the measurement object 7 (step S34: YES), in step S35, the collimating ranging unit 4 acquires the three-dimensional data related to a target of measurement 6 that has been set at a measurement location by collimation of the telescope portion 45. The target of measurement 6 is set in the data-deficient part among the measurement object 7. In addition, based on the three-dimensional data related to the target of measurement 6, the collimating ranging unit 4 indirectly acquires the three-dimensional data related to the data-deficient part.

For example, the worker or the like checks the data-deficient part using an image indicating the intensity of the second reflected ranging light 566 that is displayed on the display portion 471 according to the processing of step S33 and sets the target of measurement 6 in the data-deficient part. In this case, the operation display portion 47 may be made attachable to and detachable from the collimating ranging unit 4 and connected to the collimating ranging unit 4 by prescribed wired or wireless means so as to be capable of communicating with the collimating ranging unit 4. For example, the operation display portion 47 may be a portable terminal apparatus such as a smart phone or a tablet computer. In this case, the worker or the like can detach the operation display portion 47 from the collimating ranging unit 4 and grip the operation display portion 47 to remotely operate the collimating ranging unit 4. Therefore, even if the worker or the like is alone, by checking the data-deficient part using an image indicating the intensity of the second reflected ranging light 566 that is displayed on the display portion 471 of the operation display portion 47 having been detached from the collimating ranging unit 4, setting the target of measurement 6 in the data-deficient part, and remotely operating the collimating ranging unit 4 to perform collimation of the telescope portion 45, a measurement location to be ranged by the collimating ranging unit 4 can be set to the target of measurement 6.

When the target of measurement 6 set in the data-deficient part is set at the measurement location by the collimation of the telescope portion 45, the collimating ranging unit 4 performs a survey (ranging and angle measurement) of the target of measurement 6 and acquires the three-dimensional data related to the target of measurement 6.

For example, the target of measurement 6 has a reflecting portion provided with a retroreflective layer or the like and a contact portion to be brought into contact with a measurement location (a measurement point) where three-dimensional data is to be acquired. The contact portion is, for example, a tip of a pole included in the target of measurement 6. A distance between the reflecting portion and the contact portion is known. In other words, the three-dimensional survey apparatus 2 recognizes the distance between the reflecting portion and the contact portion as known. Therefore, by acquiring three-dimensional data related to the reflecting portion of the target of measurement 6 set at the measurement location by the collimation of the telescope portion 45, the control calculation portion 46 can calculate the three-dimensional data related to the measurement location (the measurement point) and indirectly acquire the three-dimensional data related to the measurement location (the measurement point). Accordingly, the three-dimensional data related to the data-deficient part is indirectly acquired based on the three-dimensional data related to the target of measurement 6 having been acquired by the collimating ranging unit 4.

Next, in step S36, the control calculation portion 46 executes control to replenish the three-dimensional data related to the data-deficient part having been acquired by the collimating ranging unit 4 to the point cloud data having been acquired by the scanner unit 5. The three-dimensional data to be replenished to the point cloud data is three-dimensional data having been indirectly acquired by the collimating ranging unit 4 via the target of measurement 6 in step S35 and which is related to the data-deficient part. Subsequently, the control calculation portion 46 ends the three-dimensional survey by the three-dimensional survey apparatus 2.

According to the second specific example, the control calculation portion 46 can more reliably suppress an occurrence of a data-deficient part by reliably replenishing the three-dimensional data related to the data-deficient part having been indirectly acquired by the collimating ranging unit 4 via the target of measurement 6 with the point cloud data having been acquired by the scanner unit 5.

Figure 6:
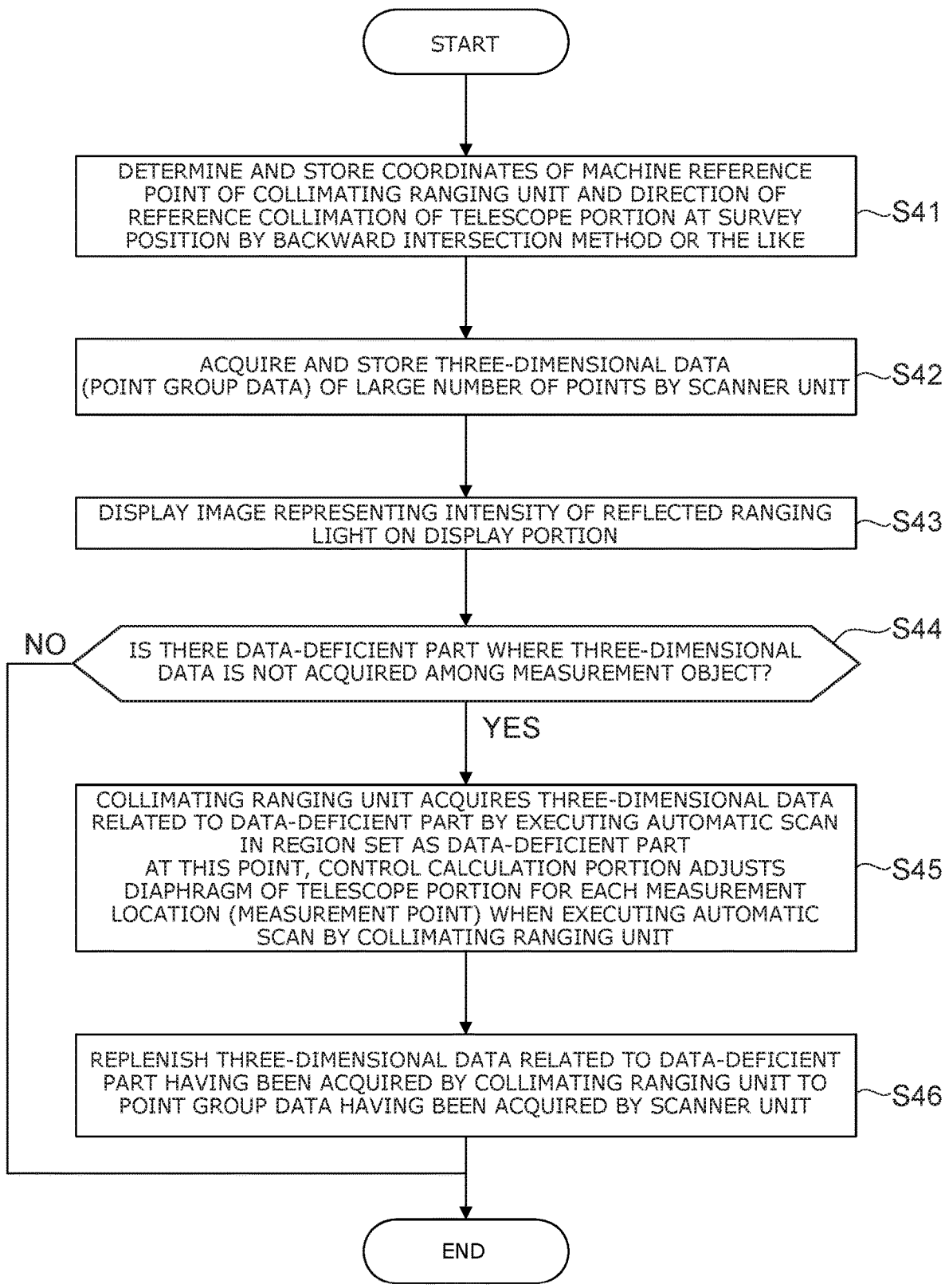
FIG. 6 is a flow chart that represents a third specific example of operations of the three-dimensional survey apparatus according to the present embodiment.

FIG. 6 is a flow chart that represents a third specific example of operations of the three-dimensional survey apparatus according to the present embodiment.

First, processing of steps S41 to S44 is the same as the processing of steps S11 to S14 described earlier with reference to FIG. 3.

In step S44, when there is a data-deficient part where three-dimensional data has not been acquired among the measurement object 7 (step S44: YES), in step S45, the collimating ranging unit 4 executes an automatic scan in a region that has been set at a measurement location. With respect to the "region set at a measurement location", for example, the worker or the like checks a data-deficient part using an image indicating the intensity of the second reflected ranging light 566 that is displayed on the display portion 471 according to the processing of step S43 and sets a measurement location to be subjected to an automatic scan by the collimating ranging unit 4 using the operation inputting portion 472.

As described above, in step S45, the collimating ranging unit 4 executes an automatic scan in the region that is set at the measurement location as the data-deficient part, performs a survey (ranging and angle measurement) of the data-deficient part, and acquires the three-dimensional data related to the data-deficient part. For example, in step S45, the control calculation portion 46 executes control to acquire the three-dimensional data related to the data-deficient part by causing the collimating ranging unit 4 to execute an automatic scan in the region that is set as the data-deficient part.

In this case, when the collimating ranging unit 4 executes an automatic scan in the region that is set at the measurement location, the control calculation portion 46 adjusts a diaphragm of the telescope portion 45 for each measurement location (measurement point). Therefore, in step S45, when executing an automatic scan in the region that is set at the measurement location, the collimating ranging unit 4 can more reliably acquire the three-dimensional data related to the data-deficient part even when the intensity of the second reflected ranging light 566 that is reflected by a predetermined portion of the measurement object 7 is relatively high.

Next, in step S46, the control calculation portion 46 executes control to replenish the three-dimensional data related to the data-deficient part having been acquired by the collimating ranging unit 4 to the point cloud data having been acquired by the scanner unit 5. The three-dimensional data to be replenished to the point cloud data is three-dimensional data which has been acquired by the automatic scan by the collimating ranging unit 4 in step S45 and which is related to the data-deficient part. Subsequently, the control calculation portion 46 ends the three-dimensional survey by the three-dimensional survey apparatus 2.

According to the third specific example, for example, even if the worker or the like does not set a measurement location for each data-deficient part by collimation of the telescope portion 45, by setting a prescribed region as the data-deficient part, the collimating ranging unit 4 automatically executes a scan and acquires the three-dimensional data related to the data-deficient part. Therefore, the collimating ranging unit 4 can efficiently acquire the three-dimensional data related to the data-deficient part. Accordingly, the control calculation portion 46 can suppress an occurrence of a data-deficient part by efficiently replenishing the three-dimensional data related to the data-deficient part having been acquired by the collimating ranging unit 4 to the point cloud data having been acquired by the scanner unit 5.

Figure 7:
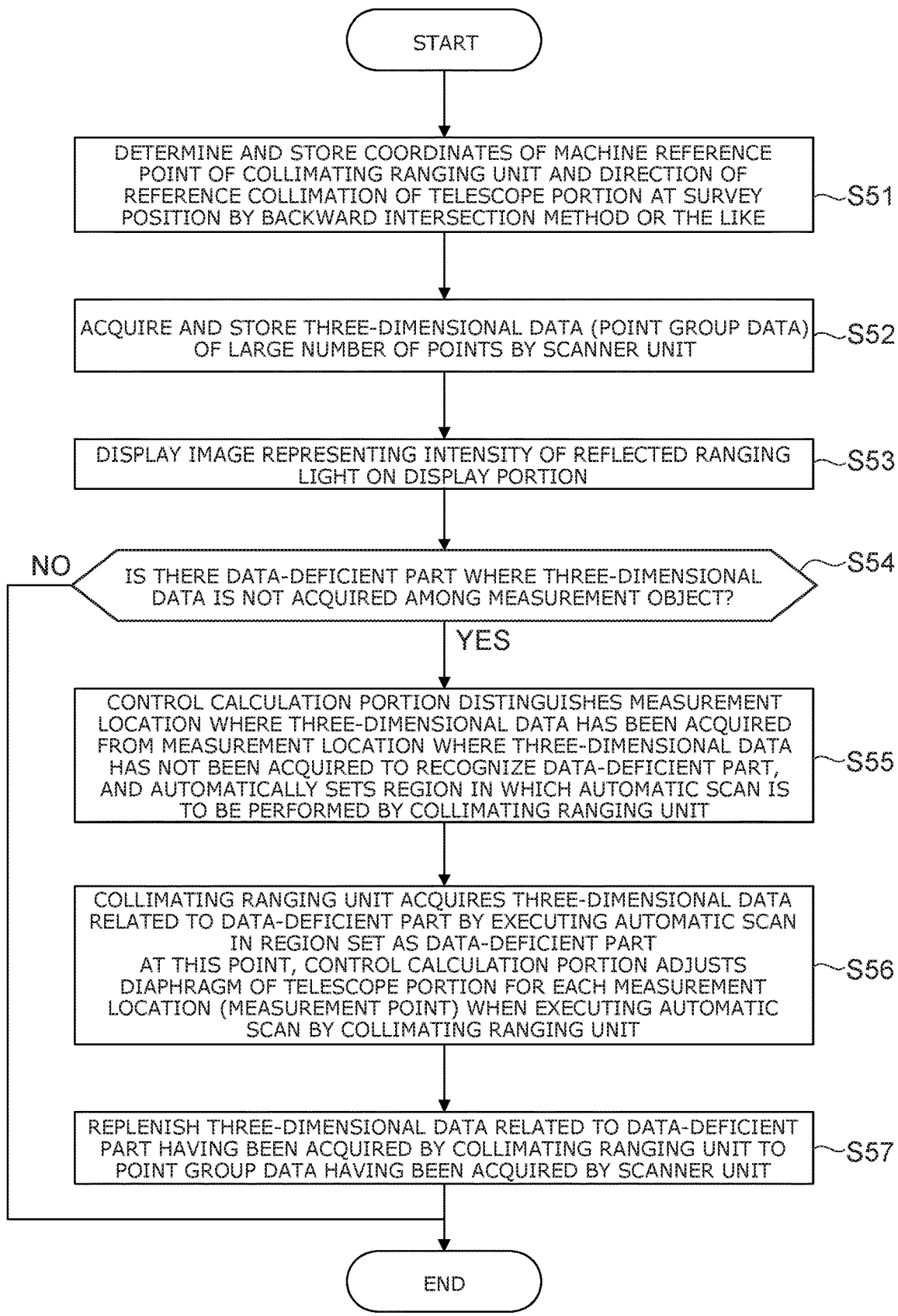
FIG. 7 is a flow chart that represents a fourth specific example of operations of the three-dimensional survey apparatus according to the present embodiment.

FIG. 7 is a flow chart that represents a fourth specific example of operations of the three-dimensional survey apparatus according to the present embodiment.

First, processing of steps S51 to S54 is the same as the processing of steps S11 to S14 described earlier with reference to FIG. 3.

In step S54, when there is a data-deficient part where three-dimensional data has not been acquired among the measurement object 7 (step S54: YES), in step S55, the control calculation portion 46 distinguishes a measurement location where three-dimensional data has been acquired from a measurement location where three-dimensional data has not been acquired to recognize a data-deficient part and automatically sets a region in which an automatic scan is to be performed by the collimating ranging unit 4. In other words, the control calculation portion 46 automatically sets a data-deficient part (a measurement location where three-dimensional data has not been acquired) as a region in which an automatic scan is to be performed by the collimating ranging unit 4.

For example, the collimating ranging unit 4 may have a built-in imaging unit such as a camera. In this case, a signal related to an image captured by the imaging unit is transmitted to the control calculation portion 46. The control calculation portion 46 can execute image processing based on the image signal transmitted from the imaging unit and recognize a measurement location where three-dimensional data has been acquired and a measurement location where three-dimensional data has not been acquired among the measurement object 7. In other words, the control calculation portion 46 can execute image processing based on the image signal transmitted from the imaging unit and recognize whether or not there is a data-deficient part that is referred to as a "missing part" or the like where three-dimensional data is not acquired among the measurement object 7 when the scanner unit 5 acquires point cloud data. In addition, the control calculation portion 46 may execute image processing based on the image signal transmitted from the imaging unit and automatically set a region in which an automatic scan is to be performed by the collimating ranging unit 4. Next, processing of steps S56 and S57 is the same as the processing of steps S45 and S46 described earlier with reference to FIG. 6.

According to the fourth specific example, since the control calculation portion 46 automatically sets a region in which an automatic scan is to be performed by the collimating ranging unit 4, even if the worker or the like does not set a region to be automatically scanned by the collimating ranging unit 4 using the operation display portion 47 or the like, the control calculation portion 46 recognizes the data-deficient part and automatically sets the region in which the automatic scan is to be performed by the collimating ranging unit 4. Accordingly, the control calculation portion 46 can efficiently acquire the three-dimensional data related to the data-deficient part with the collimating ranging unit 4 and efficiently replenish the three-dimensional data related to the data-deficient part to the point cloud data having been acquired by the scanner unit 5.

An embodiment of the present invention has been described above. However, it is to be understood that the present invention is not limited to the embodiment described above and that various modifications can be made without departing from the scope of the appended claims. The configurations of the embodiment described above can be partially omitted or arbitrarily combined in manners that differ from those described above.

The invention claimed is:

1. A three-dimensional survey apparatus that acquires three-dimensional coordinates of a measurement point with respect to a measurement object, the three-dimensional survey apparatus comprising:

a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation to acquire three-dimensional coordinates;

a scanner unit which is integrally provided with the collimating ranging unit and rotatingly emits second ranging light and which, based on second reflected ranging light that is reflection of by the measurement object, measures a distance to the measurement object and detects an emission direction of the second ranging light to acquire point cloud data, comprising three-dimensional coordinates, related to the measurement object; and a control calculation portion which is provided in at least one of the collimating ranging unit and the scanner unit, wherein the control calculation portion executes, if there is a first measurement location where the three-dimensional coordinates have been acquired and a second measurement location where the three-dimensional coordinates have not been acquired among the measurement object when the scanner unit acquired the point cloud data, control to provide the three-dimensional coordinates related to the second measurement location acquired by the collimating ranging unit to the point cloud data to hole-plug the three-dimensional coordinates related to the second measurement location of the point cloud data.

2. The three-dimensional survey apparatus according to claim 1, wherein the collimating ranging unit directly acquires the three-dimensional coordinates related to the second measurement location by the collimation of the telescope portion.

3. The three-dimensional survey apparatus according to claim 1, wherein the collimating ranging unit indirectly acquires the three-dimensional coordinates related to the second measurement location by acquiring the three-dimensional coordinates related to a target of measurement which is set in the second measurement location and which is set at the second measurement location by the collimation of the telescope portion.

4. The three-dimensional survey apparatus according to claim 1, wherein the collimating ranging unit acquires the three-dimensional coordinates related to the second measurement location by executing an automatic scan in a region that is set as the second measurement location.

5. The three-dimensional survey apparatus according to claim 4, wherein the control calculation portion recognizes the second measurement location and automatically sets the region in which the scan is to be performed by the collimating ranging unit.

6. The three-dimensional survey apparatus according to claim 5, wherein the control calculation portion executes control to adjust a diaphragm of the telescope portion for each measurement location when executing the scan by the collimating ranging unit.

7. The three-dimensional survey apparatus according to claim 4, wherein the control calculation portion executes control to adjust a diaphragm of the telescope portion for the second measurement location when executing the scan by the collimating ranging unit.

8. The three-dimensional survey apparatus according to claim 1, wherein the collimating ranging unit has an operation display portion, and the control calculation portion executes control to cause an image indicating an intensity of the second reflected ranging light to be superimposed on an image of a collimation range of the telescope portion and to be displayed by the operation display portion.

9. The three-dimensional survey apparatus according to claim 8, wherein the operation display portion is made attachable to and detachable from the collimating ranging unit and connected to the collimating ranging unit so as to be cap able of communicating with the collimating ranging unit, and the collimating ranging unit, based on remotely operating from the operation display portion, acquires the three-dimensional coordinates related to the second measurement location.

10. The three-dimensional survey apparatus according to claim 1, wherein the control calculation portion distinguishes the first measurement location from the second measurement location, recognizes the second measurement location and automatically sets a region, and the collimating ranging unit acquires the three-dimensional coordinates related to the second measurement location by executing an automatic scan in the region that is set by the control calculation portion.

11. The three-dimensional survey apparatus according to claim 10, wherein the collimating ranging unit has a built-in imaging unit, and the control calculation portion executes image processing based on an image signal transmitted from the imaging unit, distinguishes the first measurement location form the second measurement location, and recognizes the second measurement location.

12. A three-dimensional survey method, which is executed by a three-dimensional survey apparatus, the three-dimensional survey apparatus acquiring three-dimensional coordinates of a measurement point with respect to a measurement object and including:

a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation to acquire the three-dimensional coordinates;

a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data comprising a plurality of the three-dimensional coordinates related to the measurement object; and a control calculation portion which is provided in at least one of the collimating ranging unit and the scanner unit, wherein the three-dimensional survey method comprises the step of:

providing, if there is a first measurement location where the three-dimensional coordinates have been acquired and a second measurement location where the three-dimensional coordinates have not been acquired among the measurement object when the scanner unit acquired the point cloud data, the three-dimensional coordinates related to the second measurement location acquired by the collimating ranging unit to the point cloud data to hole-plug the three-dimensional coordinates related to the second measurement location of the point cloud data.

13. A three-dimensional survey program, which is executed by a computer of a three-dimensional survey apparatus that acquires three-dimensional coordinates of a measurement point with respect to a measurement object, the three-dimensional survey apparatus including:
  a collimating ranging unit which irradiates the measurement object with first ranging light by collimation of a telescope portion and which, based on first reflected ranging light that is reflection of the first ranging light by the measurement object, measures a distance to the measurement object and detects a direction of the collimation to acquire the three-dimensional coordinates;
  a scanner unit which is integrally provided with the collimating ranging unit and rotatingly emits second ranging light and which, based on second reflected ranging light that is reflection of the second ranging light by the measurement object, measures a distance to the measurement object and detects an emission direction of the second ranging light to acquire point cloud data comprising a plurality of the three-dimensional coordinates related to the measurement object; and a control calculation portion which is provided in at least one of the collimating ranging unit and the scanner unit, wherein
the three-dimensional survey program causes the computer to execute the step of:
  providing, if there is a first measurement location where the three-dimensional coordinates have been acquired and a second measurement location where the three-dimensional coordinates have not been acquired among the measurement object when the scanner unit acquired the point cloud data, the three-dimensional coordinates related to the second measurement location acquired by the collimating ranging unit to the point cloud data to hole-plug the three-dimensional coordinates related to the second measurement location of the point cloud data.

* * * * *

UNITED STATES PATENT AND TRADEMARK OFFICE
CERTIFICATE OF CORRECTION

| | |
|---|---|
| PATENT NO. | : 11,692,823 B2 |
| APPLICATION NO. | : 17/017715 |
| DATED | : July 4, 2023 |
| INVENTOR(S) | : Ito et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 350 days.

Signed and Sealed this
Twenty-second Day of October, 2024

*Katherine Kelly Vidal*

Katherine Kelly Vidal
*Director of the United States Patent and Trademark Office*